Sept. 1, 1959
J. L. KENNEDY ET AL
2,902,030
ALERTNESS INDICATOR
Filed Aug. 4, 1953
3 Sheets-Sheet 1
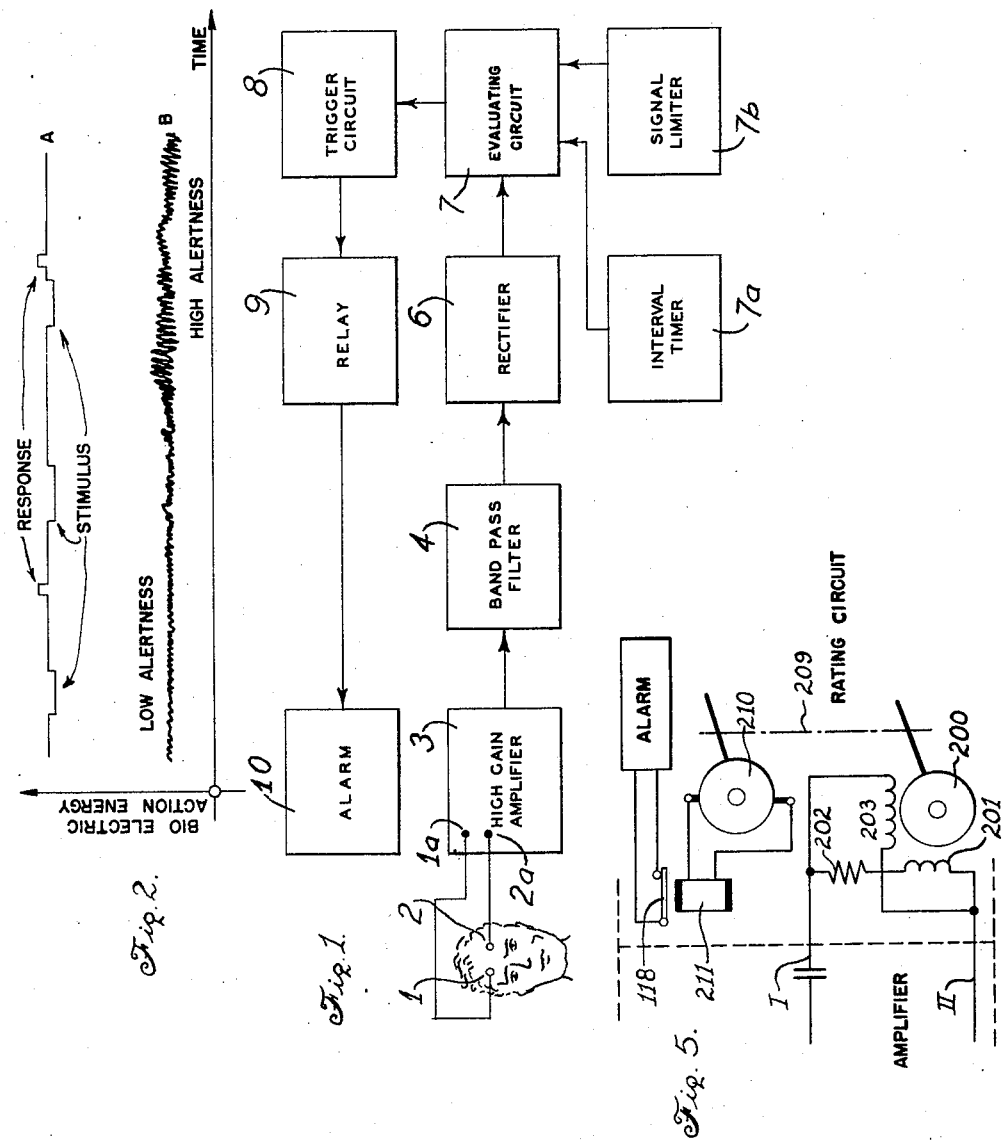
INVENTOR.
JOHN L. KENNEDY
ROLAND C. TRAVIS
BERTRAM WELLMAN
BY
Roberts, Cushman & Grover
att'ys.

Sept. 1, 1959     J. L. KENNEDY ET AL     2,902,030
ALERTNESS INDICATOR
Filed Aug. 4, 1953     3 Sheets-Sheet 2
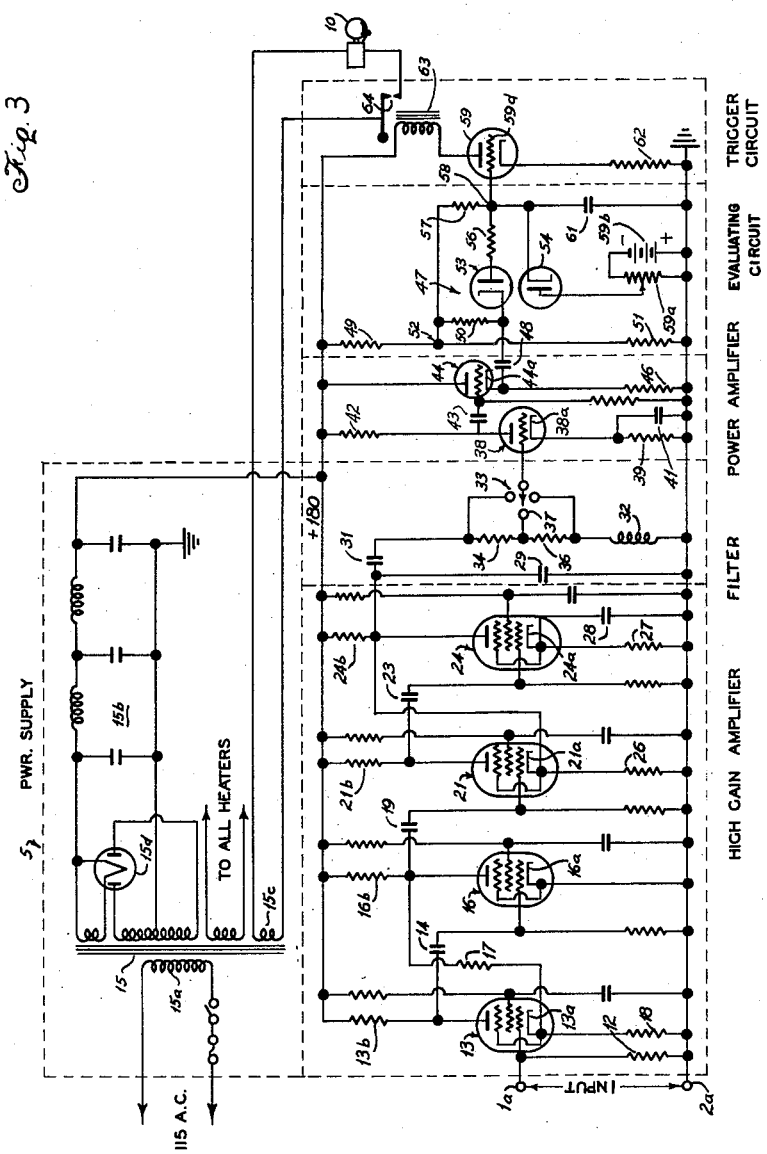
INVENTOR.
JOHN L. KENNEDY
BY ROLAND C. TRAVIS
BERTRAM WELLMAN

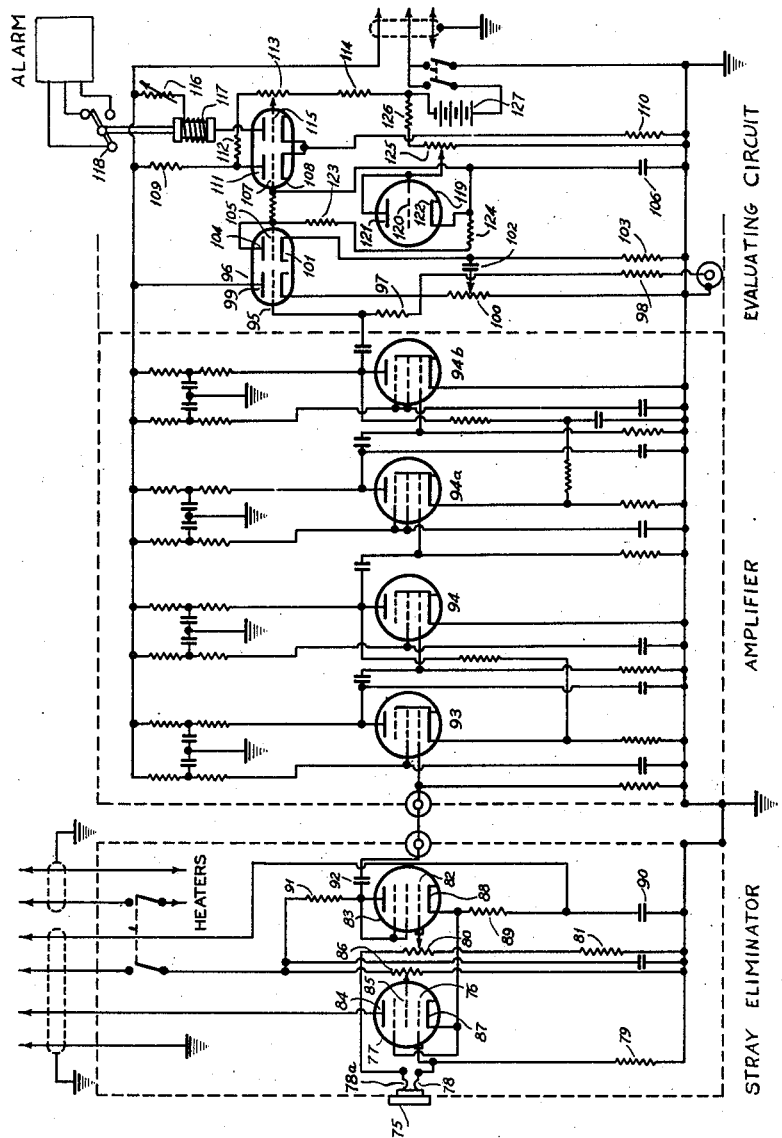

United States Patent Office 2,902,030
Patented Sept. 1, 1959

2,902,030

ALERTNESS INDICATOR

John L. Kennedy, Santa Monica, and Roland C. Travis, Highland, Calif., and Bertram Wellman, Lincoln, Mass.

Application August 4, 1953, Serial No. 379,693

7 Claims. (Cl. 128—2.1)

(Filed under Rule 47(a) and 35 U.S.C. 116)

This invention relates to a method and apparatus for determining the alertness status of human beings and animals and particularly to a method and apparatus utilizing electrical impulses of bioelectrical origin to provide an indication of a subject's readiness to respond to external stimuli. This application is a continuation-in-part of copending application Serial No. 79,532, filed March 4, 1949, now abandoned.

One of the practical applications of the invention is its use in determining when the alertness status of individuals engaged in monotonous jobs or engaged in continuous duty of a routine nature falls below a predetermined standard. It is within the contemplation of the present invention to provide suitable additional apparatus for supplying appropriate feed-back or stimuli to the individual for the maintenance of a body condition which will make the person or animal responsive to external stimuli.

Heretofore considerable research has been done in connection with the measurement of electrical impulses developed in the human system, both in the brain itself and in the muscle cells, as well as the measurement of electrical resistance changes in the skin associated with the emotional states and the effects of stimulation and other physiological and psychological functions.

Apparatus and equipment for the amplification, faithful recording, and indicating of these electrical potentials have been constructed and are well known. Also, heretofore the practical application of the measurement and study of the electrical brain waves developed has been primarily in connection with the diagnosis of pathological conditions of the brain. The electrocardiograph, which is well known, is an example of a device which relies upon electrical impulses developed in the human body and this device is also utilized primarily for the purposes of diagnosis of pathological conditions of certain organs of the body, primarily the heart. The so-called lie detector is an example of apparatus utilizing changes in the resistance of the skin for determining emotional stress.

However, as far as we are aware, it has not been known heretofore that the pattern of the electrical impulses of bioelectric origin developed in certain muscles and regions of the body give an accurate index of the readiness of a person to respond to external stimuli. In other words, although it has heretofore been known that there is a definite association between electrical impulses of a bioelectric origin and the emotional status of a human being, the significance of the pattern of its emission has not been known.

By alertness status is meant the capacity of the individual to respond to external stimuli, such as the approach of danger. The variability of readiness to respond rapidly, appropriately and adequately to external stimuli, as is well known, extends from conditions of extreme awareness through less and less alertness down to the condition of sleep. This alertness status has been measured in the research supporting this application of the present invention by determining the reaction time to a variety of external stimuli both in situaitons simulating that of continuous operations, such as driving automobiles, trucks, airplanes and the like, and in situations simulating the task of a look-out.

In order to utilize the bioelectric energy produced in the human body as an index of alertness, it is necessary to provide apparatus capable of carrying out a method of continuously evaluating or rating the bioelectric energy produced. Experiments have shown that these impulses are not regular functions of time but vary sporadically both in amplitude and frequency. A preferred embodiment of the invention utilizes the rate of emission of bioelectric energy as a criterion for determining the alertness status of the subject.

It is thus the primary object of the present invention to provide for the indication of the alertness status of human beings and animals. Another object is to provide a technique by means of which an index of alertness status of a human being or animal can be determined and the point indicated at which the subject is no longer capable of responding within an interval considered necessary to properly perform a given function. A further object is the provision of apparatus for determining the alertness status of a body with the aid of muscle action potentials developed in the supraorbital region of the head.

In its main aspect, the invention provides apparatus for determining the rate of emission of dioelectric energy, for example defined in terms of electric potential between any two points on the body of a human being or animal, and for deriving therefrom an index of the alertness status.

In another aspect, the invention provides apparatus responsive to the rate of emission of bioelectric energy produced by a human body or animal body per unit time, for continuously evaluating the total amount of energy of bioelectric origin produced between any two points on the body of a human being or animal, for the purpose of indicating the changing alertness status and for supplying appropriate feed-back stimuli to maintain the body in a condition responsive to external stimuli.

Other objects and aspects of novelty will appear, in addition to those contained in the above summary of the invention indicating its nature and substance including some of its objects, from the herein presented outline of its principles, its mode of operation and its practical possibilities together with a description of several typical embodiments illustrating its novel characteristics. These refer to drawings in which—

Fig. 1 is a block diagram of apparatus according to the present invention;

Fig. 2 is a diagram illustrating the method according to the present invention;

Fig. 3 is a circuit diagram of the electrical apparatus utilized in the presently preferred embodiment of the invention;

Fig. 4 is a circuit diagram of an alternative embodiment of the invention; and

Fig. 5 is the circuit diagram of the evaluator of an additional embodiment of the invention.

The invention is based on the discovery that there are certain bioelectric potentials predominant in certain parts of the body which can be used as an index to the alertness status. In general, these potentials predominate in the supraorbital region and on the pinna or external ear. The exact reason for this is not known but it is believed these potentials exist in regions where there are thin sheets of muscle immediately under the surface of the skin. By the use of a special electronic measuring and evaluating technique, novel relationships have been found between the reaction time of an individual to a periodic stimuli in a monotonous or routine situation and the frequency and amplitude of the muscle spike potentials developed.

The term muscle spikes used herein refers to the bioelectric impulses above a frequency of 40 cycles which originate at the points in the supraorbital region of the head with which the electrodes are in contact. The term muscle spike potentials is used to distinguish the potentials above defined from what is usually referred to as brain wave potentials which in general are below 40 cycles per second. These potentials are herein used as units defining the energy of the bioelectric impulses herein dealt with. It is also to be understood that where reference is made to the evaluation or rating of the total electrical energy developed at the points in which the electrodes are in contact is to be understood to include all of the bioelectric energy developed at that point above 40 cycles even though some of this energy may be considered to be impulses directly from the brain.

As an example of the relation between the reaction time of an individual and the frequency of electric impulses of bioelectric origin, experiments were made in which the person was instructed to respond by pressing a key as quickly as possible when occasional stimuli such as the simultaneous flash of light and the sound of a buzzer were presented. Apparatus having two electrodes placed at spaced points on the supraorbital region of the head was used. As a result of experiments which will be further discussed below with reference to Fig. 2, it was found that there was a definite and distinct reduction in the number of muscle spike potentials as the response time became longer. In this experiment it was also found that in all instances in which the subject had fallen asleep during a long monotonous experimental session, the muscle spike potentials which are the so-called high frequency impulses as well as the low frequency potentials, which are generally referred to as brain waves, showed a very low level of activity.

The relation of the low frequency brain wave to the alertness status of the individual is not well understood. However, it was found that there is a definite relation between the frequency and the amplitude of the so-called high frequency muscle spike impulses above approximately 40 cycles per second and the alertness status of the subject.

In the experiment mentioned above an additional stimulus in the form of a loud knock on the door of the room was applied to the subject at a time when he was asleep. The results showed that more effort was expended in the "startle" response to a knock on the door than to the next stimulus and that the response time rapidly approached normal in subsequent presentations of stimuli. By providing a suitable apparatus which can measure and evaluate the level of bioelectric energy developed at predetermined points on the human body it is possible automatically to warn personnel engaged in monotonous tasks before dangerous conditions of inalertness occur.

Since the occurrence of muscle spike potentials is subject to statistical fluctuations, the apparatus used for determining the alertness status comprises suitable evaluating means for obtaining resultant values of the impulses, such as flattening, averaging or integrating means, to eliminate false indications which would be given if only instantaneous values were used as a criterion.

Referring specifically to Figure 1, showing the schematic arrangement of the units of the apparatus for carrying out the present invention, a pair of electrodes 1 and 2 are adapted to be placed in contact with the skin in the supraorbital region of the head of a person. The electrodes can be small discs of sponge rubber wetted with saline solution or small metal discs attached to the surface of the skin with adhesive tape. A good low resistance contact can be provided by washing the skin with ether and applying a small amount of electrode jelly between the skin and a metal electrode. By this method it is possible to obtain a suitable low resistance contact. The electrodes 1 and 2 are connected by suitable leads to the input terminals 1a and 2a, respectively, of a high gain amplifier 3. The output of the high gain amplifier is connected to a band-pass filter 4 peaked at approximately 200 cycles per second where frequencies below approximately 40 cycles per second are substantially cut off. The output from the filter 4 is rectified in rectifier 6 and passed to a special rating circuit 7 which can be provided with a suitable interval timer 7a and a signal limiter 7b. It will be readily apparent to those skilled in the art that the output from the rating circuit can be used to operate any kind of device through a suitable electrical relay. In the drawings the output of the rating circuit 7 is shown as being fed to a suitable trigger circuit 8 which operates a relay 9, which in turn operates an alarm 10. The alarm 10 may be any device capable of providing a visible or audible signal which may be used as an external stimulus to the person to whom the apparatus is connected or, alternatively, it may be used to warn a supervisor that the alertness status of the subject has dropped to a low level. Also, if desired, any suitable recording device could be substituted for the alarm 10 in the event it is desired to keep a continuous time record of the alertness level of the subject.

Fig. 2 shows the general character of the input signal which is evaluated by the technique according to the invention. In this figure, trace A is a stimulus response line where downward deviations indicate a stimulus such as a light flash, whereas an upward deviation indicates response of the person such as operation of a telegraphic key. It will be noted that the subject failed to respond to the second stimulus due to dozing off. The trace B represents action potentials derived from electrodes such as above described. As indicated by legends, it shows the decreased energy level at a low alertness status and the sudden return of action energy when alertness is suddenly increased.

Referring to Fig. 3, a presently preferred embodiment of the electrical apparatus includes a suitable power supply 5 of conventional design and toward which no claim of novelty is directed. The power supply includes a transformer 15, the primary 15a of which is connected to a source of alternating voltage and the secondaries of which have connected thereto a full wave rectifier 15d, and the heater circuits for all the vacuum tubes. An additional secondary 15c supplies power for an alarm or signaling device 10. A conventional filter 15b filters the output of the full wave rectifier.

The input terminals 1a and 2a of the main indicator circuit are connected across an input resistance 12 in the grid circuit of the first tube 13 of a four stage resistance-condenser coupled high-gain class A amplifier. All of the tubes in the amplifier are of the pentode type and the amplifier stages are conventional in construction. The plate circuit of the tube 12 is connected through the condenser 14 to the input circuit of the second tube 16. The plate of tube 16 is connected through a resistance 17 to the cathode 13a of the first tube. This cathode is biased through a resistor 18. It will be noted that the potential drop through the resistance 18, and therefore the bias on the cathode 13a, will vary with and be dependent upon the plate current of the tube 16, whereby a degenerative action or negative feed-back is applied to the first tube 13 thereby increasing its stability. It will also be noted that the output of tube 16 is connected through condenser 19 to the input circuit of the third tube 21. The cathode 16a of the tube 16 operates at ground potential. The output of tube 21 is connected through condenser 23 to the input of the fourth tube 24.

The plate of tube 24 is connected to cathode 21a of the tube 21, which is biased by the resistor 26. The variations in the plate current of the tube 24 vary the bias on the cathode 21a to give a negative feed-back for stabilizing tube 24. The cathode 24a is connected to ground through a bias resistor 27 which is shunted by condenser 28. The resistance drop through the resistor 27 applies the necessary self-bias to the cathode 24a. All of the tubes 13, 16, 21 and 24 have appropriate plate resistors 13b, 16b, 21b and 24b, respectively.

A band-pass filter section peaked at approximately 200 cycles in the output of tube 24 comprises the shunt condenser 29, the series condenser 31, and the inductive reactance 32. A voltage divider 33 is included in the output circuit of the filter section. The voltage divider 33 comprises the two resistors 34 and 36 and a three-point selector switch 37 for appropriately adjusting the voltage input to a power amplifier 38. The cathode 38a of the power amplifier 38 is self-biased through the resistor 39 which is shunted with an appropriate by-pass condenser 41.

The tube 38 is provided with a suitable plate resistor 42, the plate side of which is connected through the condenser 43 to the input grid circuit of the cathode follower tube 44. Tube 44 is self-biased by means of the cathode resistor 46 which also serves as the output circuit of the tube. The variations of the evaluating or potential between the cathode 44a and ground are fed into the rectifier-rating network 47 which constitutes the above mentioned evaluating means through condenser 48 and resistor 50. Suitable power resistors 49 and 51 are in series across the power supply 5 and the bias for the rectifier rating network is supplied at a point 52 between these resistors.

The evaluating or rectifier-rating network 47 comprises a diode rectifier 53 and a limiter 54, and resistors 50, 56 and 57, connected to one side of condenser 61. The cathode of the diode 53 is connected to a point intermediate the condenser 48 and the resistor 50 and the anode thereof is connected to the point 52 through resistors 56 and 57, the intermediate point 58 being connected to the control electrode 59d of an electronic valve such as the relay tube 59, to the cathode of the diode 54, and to one side of the integrating condenser 61. The anode of the signal limiter diode 54 is connected to a resistance 59a shunted by a source of potential 59b to provide a negative potential for said anode. The other side of the condenser 61 is connected to the negative or ground side of the direct current power supply. The relay tube 59 is provided with a cathode biasing resistor 62 and the plate circuit of the tube is connected through the energizing coil of relay 63 to the positive side of the direct current power supply 5. When the relay 63 is energized, the contacts 64 thereof are adapted to close the circuit through the alarm device 10.

From the above description it will be readily apparent that the tubes 13, 16, 21 and 24 constitute a more or less conventional class A high gain amplifier with a substantially flat response characteristic over a large range of frequencies including frequencies of the order of 40 cycles per second and above. The amplifier system as previously described is provided with a suitable band-pass filter for cutting off all frequencies below 40 cycles per second. The resultant output is supplied to the power amplifier 38, the output of which is fed through the cathode follower tube 44 to the evaluating network.

It will be noted in this connection that the output of the cathode follower tube 44 is applied to the evaluating network 47 through the condenser 48. This output contains both positive and negative components. The application of the positive portions of this voltage to the cathode of the rectifier tube 53 will not cause the tube to conduct and hence no current will flow in the tube circuit. However, the tube 53 will conduct when the negative components of the output of the cathode follower tube 44 appear on its cathode. When the tube 53 conducts, and in effect it is now operating as a half wave rectifier, the rectified current passing through the condenser 61 charges that condenser in such a manner as to place a negative charge upon the upper plate of said condenser, i.e. the plate connected to the grid 59d of the relay tube 59, and consequently to place a negative potential upon the grid 59d of the relay tube 59.

The relay tube 59 is normally biased so as to be in a conducting state when there is no input to the amplifier input terminals 1a, 2a. The continual application of the negative portions of the amplified input potentials to the rectifier tube 53 lead to a building up of a charge upon the condenser 61. A continual discharge path for this charge is provided through the resistor 57 and the time constant of this discharge circuit determines as a weighting function the dissipation of the charge upon the condenser 61 per unit time. Thus the quantity of charge present upon the condenser 61 at any given instant of time depends upon the rate of application of the charge which in turn ultimately depends upon the state of alertness of the individual or subject and the rate of dissipation of the charge through the discharge circuit. In the event the charge upon the condenser 61 is bleeding off more rapidly than the charge is being built up, the potential of the grid 59d, which is dependent upon the charge on condenser 61 at any given instant, will rise and when it reaches a potential sufficient to permit the relay tube 59 to conduct, the tube 59 will fire and the resultant current flowing through the energizing coil 63 of the relay 64 will complete the alarm circuit and cause the alarm system to ring. Thus the charge upon the condenser 61, at any given instant, is proportional to the rate of emission of energy of the muscle spike potential for a fixed time constant for the discharge circuit and when this rate of emission of energy falls below a predetermined amount, the alarm system will be energized. This time constant defines a weighting function over which the resultants are averaged. In this example the resultants are furnished by the averaging function of the circuit containing condenser 61 and resistor 57. In the schematic diagram Fig. 1 the component designated the interval timer 7a consists of the condenser 61, the resistor 57 and the associated network as shown in detail in Fig. 3. Likewise the signal limiter 7b (see Fig. 1) comprises the diode 54 and its biasing network as shown in detail in Fig. 3.

The signal limiting diode 54 and its bias network in the plate circuit, i.e. the battery 59b paralleled by resistor 59a, provide a means of controlling the maximum value of negative potential present upon the grid 59d of the trigger tube 59. This provides, in effect, a means of rendering the apparatus more sensitive in that it prevents the building up of too great a charge upon the condenser 61, i.e. one that would take too long to bleed off and in effect block the apparatus.

Fig. 4 illustrates an alternative embodiment of the invention for portable use apart from shielded conditions. The first two stages comprise a differential input circuit which permits relatively undistorted pickup of biological potentials when the subject is not in an electrostatically shielded location. Electrostatic 60 cycle effects, picked up by the subject's body as an antenna, normally require shielding in work dealing with biological potentials.

The input leads from the electrodes disposed upon the subject are connected to the apparatus through a jack 75. One of these leads is connected across the bias resistor 79 and to the grid 76 of the first tube 77 in the differential input device through the spring connector 78. The other lead is connected through a spring connector 78a to ground through a potentiometer 80 and bias resistor 81. The potential upon the grid 82 of the second tube 83 of the differential input circuit is obtained by tapping the potentiometer 80. The plate 84 of the first tube 76 is connected directly to the power supply. The screen 85 is connected to the movable tap of a potentiometer 86 connected across the power supply. The cathode 87 of the tube 77 and the cathode 88 of the tube 83 are joined together and have a common bias resistor 89. The bias resistor 89 is connected to ground through a condenser 90 and a point intermediate the resistor 89 and the condenser 90 is connected to a source of negative potential. The second tube 83 functions as a triode and has a load resistor 91 in the plate circuit. The output of the differential input circuit is taken off through a condenser 92 from the plate of the tube 83.

The circuit operates to eliminate stray 60 cycle effects picked up by the electrode leads. If 60 cycle effects are picked up by the electrode leads, both of the leads will be carrying a 60 cycle alternating wave between each lead and ground. The operation of the circuit is most easily explained by assuming a 60 cycle wave on each of the input circuits, i.e. on each of the grids 76, 82. The application of the 60 cycle wave to the grid 76 causes an alternating current to flow through tube 77; however, this current flows through the common cathode bias resistor 89 and the voltage drop across this resistor in effect causes the potential on the cathode 88 of tube 83 to follow the potential upon the grid 76 of the tube 77. The grid 76 and the grid 82 will each have a 60 cycle wave thereon in phase with each other. Since the cathode 88 of tube 83 is alternating in potential in phase with the 60 cycle alternating potential present on the grid 82, the potential difference between the grid 82 and the cathode will remain approximately constant and hence stray 60 cycle effects will not pass through tube 83. In the above, 60 cycle effects have been used as an example, however, it will be apparent to those skilled in the art that most of the stray effects picked up by the electrode leads will be cut off and not appear in the output circuit.

The muscle spike potentials which appear across the electrode leads pass through the circuit and are amplified in their passage therethrough.

The output of the differential input circuit is coupled through condenser 92 to the input section of tube 93. Tubes 93, 94, 94a and 94b and their associated circuits constitute four stages of class A resistance-condenser coupled amplifiers. There are appropriate feed-back networks from the plate of tube 94 to the cathode of tube 93 and from the plate of tube 94b to the cathode of tube 94a. These four stages of amplification are conventional in design and construction and are similar to the four stages of amplification described in detail in connection with Fig. 3.

It will be noted in connection with Fig. 4 that no power supply is described, however, a conventional power supply is, at the present time, intended and toward which no claim of novelty is directed.

The output of the fourth stage of amplification, i.e. tube 94b and its associated circuits, is applied to the grid 95 of the first half of a dual tube 96. The grid 95 is normally biased by biasing resistors 97, 98. The first half of the dual tube 96 operates as a cathode follower, the plate 99 connected directly to the plate supply and having the load resistance 100 in the cathode circuit. The output of the cathode follower is tapped from resistor 100 and applied to the cathode 101 of the second half of the tube 96 through a condenser 102. The cathode 101 is normally biased by resistor 103. The second half of the dual tube 96 operates as a diode by having its plate 104 and control grid 105 connected together. This second half of the dual tube 96 functions as a half wave rectifier in the manner described in detail with respect to the diode 53 in Fig. 3.

The second half of the dual tube 96 and its associated circuits together with the remaining circuits function in a manner similar to that described in detail with respect to the evaluating network and the trigger circuit in Fig. 2.

The output of the cathode follower stage contains both positive and negative voltage components. The second half of the dual tube 96 operates as a half wave rectifier and will pass current only when the negative voltage components are applied to the cathode 101. When current flows through the second half of the dual tube 96, the path of the current flow is through condenser 106 and, as a result of the current flow, condenser 106 is charged in such a manner as to make its upper plate, i.e. the plate connected to the grid 107 of the first half of the dual tube 108, negative. The first half of the dual tube 108 will normally be conducting and the presence of a negative potential on the grid 107, resulting from the charge on the condenser 106 will bias the tube beyond cutoff. The charge present at any given instant on the condenser 106 is determined by the rate of emission of energy of the muscle spike potentials emitted by the subject, and when the subject is in an alert condition, the charge on the condenser 106 and the potential upon the grid 107 will be sufficient to keep the first half of the dual tube 108 cut off. It will be noted that the above rating circuit operates in a manner similar to the rating circuit described in connection with Fig. 3, with capacitor 61 and resistor 57.

If the alertness status of the subject drops, the rate of emission of energy of muscle spike potentials fails and the potential of the grid 107 will rise. If the grid potential rises to a point which will permit the first half of the dual tube 108 to conduct, current will flow through the plate load resistor 109, through the tube and through the cathode biasing resistor 110. The voltage drop across the plate load resistor 109 will cause the potential upon the plate 111 to fall. This fall in potential appears across the resistance network comprising series connected resistors 112, 113, 114. This drop in potential is applied to the grid 115 of the second half of the dual tube 108. This second half of the dual tube 108 is normally conducting and current flows through the variable plate load resistor 116, the energizing coil 117 of the relay 118, through the tube and through the common cathode resistor 110. The relay 118 normally keeps the alarm or indicating circuit (not shown on drawing) open. The drop in potential appearing on the grid 115 resulting from the firing of the first half of the dual tube 108 is sufficient to cut the second half of the dual tube 108 off and the cessation of current flow de-energizes the relay coil 117 which in turn results in closing the alarm circuit and setting off the alarm.

To prevent the building up of too great a charge upon the condenser 106 and rendering the apparatus less sensitive, there is provided a signal limiting circuit. The signal limiting circuit includes the tube 119, shown in the figure as a triode but operating as a diode by having its grid 120 and plate 121 connected together. The cathode 122 is connected to the upper plate of the condenser 106 and connected to the plate 104 of the second half of the dual tube 96 by resistors 123, 124. The plate 121 is connected to a source of variable negative D.C. potential consisting of the potentiometer 125, resistor 126 and the battery 127. This tube 119 prevents the building up of too large a charge on the condenser 106 by conducting and effectively reducing the potential when its cathode potential becomes too negative. This signal limiting circuit functions in a manner similar to that described in connection with diode 54 in Fig. 3.

The apparatus shown in detail in Figures 3 and 4 is adapted to select the bioelectric impulses originating at the electrodes 1 and 2 on the subject at a frequency above 40 cycles per second and to integrate the total electrical energy in these impulses and to continuously measure the rate of emission of this bioelectric energy against time so that when this rate drops below a predetermined selected value the trigger circuit will be energized to set off an alarm or to present any suitable external stimuli to a subject under observation.

While the circuits according to Figures 3 and 4 utilize an averaging or integrating capacitance, in cooperation with a discharge circuit for the capacitance providing a weighting function, the modification according to Fig. 5 employs a watt-hour meter circuit for the purpose of carrying out the method according to the invention.

The arrangement according to Fig. 5 replaces the evaluating circuits of Figs. 1, 3 and 4 and its input conductors I and II are connected to the similarly labeled conductors of Figs. 3 and 4. The watt-hour meter 200 of conventional construction has a current coil 201 with series resistor 202 which corresponds to resistor 97 of Fig. 4, and a potential coil 203. The meter 200 is at 209 mechanically coupled to a tachometer generator 210 which supplies to relay 211 energy which varies proportionate to the speed of the watt-hour meter and the tachometer and is therefore at any moment a function of the prevailing rate of the bioelectric energy derived from the subject. The relay 211 is normally de-energized and closed. It opens upon energization of its coil 211 and remains open so long as the bioelectric energy rate is above a given level corresponding to alertness; it closes and operates the alarm when the input signal rate falls below that level. It will now be evident that the response point of the relay coil 211, corresponding for example to a certain voltage furnished by the tachometer generator 210, defines a certain critical rate against time of the continuously averaged input of bioelectric energy of the selected frequency. A particular type of averaging operation can be selected by suitable choice of the watt-hour meter according to well known principles, and relay 211 can be of any suitable type so long as it can be set to respond to a predetermined minimum input energy value corresponding to a certain value of the rate of bioelectric input, so that the relay responds to a rate below that value to operate a utilization device such as the alarm 10.

It will now be evident that the present system utilizes a mean value derived from accumulated signal strength, averaged over a time determined weighting function. This function is in the above described examples continuous and exponential but need not be necessarily so. For example, the input energy can be integrated over a predetermined time interval, and measured at the end of that interval, whereupon the integrating means is reset to zero and started to integrate over the next time interval equal to the preceeding one. The energy increments thus integrated during discrete time intervals are a measure of the average alertness status during the respective interval. A comparison of consecutive increments permits comparison of the rates of change of the frequency selected bioelectric energy just as in the case of continuous rate forming. The comparison of any increment with a standard value such as a relay tripping minimum potential can be used to determine the operation of responsive apparatus such as an alarm. Thus, absolute bioelectric energy values can be detected and evaluated, as well as rates or gradients of the change of such values, with any degree of accuracy as to averaging and smoothness of rate function.

From the foregoing description it will be seen that the present invention provides a novel means and method for determining the alertness status of human beings and animals. The invention can be utilized to warn persons engaged in monotonous or routine tasks so that they may avoid the danger of becoming inalert around operating machinery which might cause injury to the person, or at least warn the person that he should discontinue his tasks for temporary relaxation. Also, the invention may be utilized in time study operations to determine the maximum efficient capacity of persons engaged in assembly operations. It will also be apparent that instead of warning the subject under consideration, a warning may be given instead to a supervisor.

It should be understood that the present disclosure is for the purpose of illustration only and that this invention includes all modifications and equivalents which fall within the scope of the appended claims.

We claim:

1. Apparatus for determining the alertness status of a human or animal body by means of bioelectric energy impulses appearing at electrodes placed on spaced points of said body, comprising filter means for selecting from said impulses those above a predetermined frequency, means for forming resultants of consecutive energy values of said selected impulses by averaging said values during time periods which are determined by a weighting function derived from continuous accumulation of such values, relay means for delivering an actuating signal in response to a predetermined change of value of said resultants, and indicating means actuated by said relay means whereby a biological alertness status as defined by said input impulses can be determined and its biological effect evaluated and utilized.

2. Apparatus according to claim 1 wherein said resultant forming means includes means for limiting the averaged energy value.

3. Apparatus according to claim 1 wherein said resultant forming means includes means for rectifying said bioelectric energy impulses as selected by said filter means, and capacitor means connected to said rectifying means for accumulating said rectified impulses.

4. Apparatus according to claim 1 wherein said resultant forming means includes energy accumulating capacitor means and resistor means connected to said capacitor means for discharge therethrough of said values as averaged by the capacitor means.

5. Apparatus according to claim 4 wherein said relay means includes an electronic valve having a control electrode which electrode is connected between said resistor means and said resultant forming means, the potential of said electrode and hence the conductivity of said valve being determined by the rate against time of said discharge.

6. Bioelectric apparatus comprising: means for transmitting bioelectrical energy input impulses substantially only above a preselected frequency; evaluating means connected to said transmitting means for forming during a continuously given time period a resultant value of consecutive increments of energy values of said input impulses, said evaluating means including means for determining the value of a rate against said time period of said resultant value and actuating means for delivering a signal in response to a rate below said rate value; and a utilization circuit capable of responding to said signal; whereby a biological alertness status as defined by said input impulses can be determined and its biological effect evaluated and utilized.

7. Apparatus according to claim 6, wherein said rate determining means include means for deriving said resultant value from the impulse value increments as averaged over a time determined weighing function thereof.

References Cited in the file of this patent

UNITED STATES PATENTS

| | | |
|---|---|---|
| 2,010,697 | Lord | Aug. 6, 1935 |
| 2,193,945 | Strauss et al. | Mar. 19, 1940 |
| 2,439,495 | Sturm | Apr. 13, 1948 |
| 2,736,883 | Boddy | Feb. 28, 1956 |